(12) United States Patent
Lin et al.

(10) Patent No.: US 10,378,365 B2
(45) Date of Patent: Aug. 13, 2019

(54) ROTOR DEVICE, TURBINE ROTOR DEVICE, AND GAS TURBINE AND TURBINE ENGINE HAVING SAME

(75) Inventors: Feng Lin, Beijing (CN); Renji Zhang, Beijing (CN); Qianming Gong, Beijing (CN); Lei Zhang, Beijing (CN); Ting Zhang, Beijing (CN); Xiao Yuan, Beijing (CN); Wentao Yan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 1163 days.

(21) Appl. No.: 14/238,626

(22) PCT Filed: Jul. 11, 2012

(86) PCT No.: PCT/CN2012/078518
§ 371 (c)(1),
(2), (4) Date: Jun. 11, 2014

(87) PCT Pub. No.: WO2013/023507
PCT Pub. Date: Feb. 21, 2013

(65) Prior Publication Data
US 2014/0301858 A1   Oct. 9, 2014

(30) Foreign Application Priority Data
Aug. 15, 2011 (CN) .......................... 2011 1 0233574

(51) Int. Cl.
*F01D 5/22* (2006.01)
*F01D 5/28* (2006.01)
(Continued)

(52) U.S. Cl.
CPC .............. *F01D 5/282* (2013.01); *F01D 5/03* (2013.01); *F01D 5/225* (2013.01); *F01D 5/288* (2013.01);
(Continued)

(58) Field of Classification Search
CPC . F01D 5/282; F01D 5/225; F01D 5/34; F01D 21/045; F05D 2300/603
See application file for complete search history.

(56) References Cited

U.S. PATENT DOCUMENTS 3,095,138 A * 6/1963 Warnken ................. F01D 5/225
                                                                                   415/217.1
3,857,650 A * 12/1974 Cerrato .................. F01D 21/045
                                                                                      416/189
(Continued)

FOREIGN PATENT DOCUMENTS

CN         1163982 A      11/1997
CN       101482029 A       7/2009
(Continued)

OTHER PUBLICATIONS

Cairo et al., Functionally Gradient Ceramic Coating for Carbon-Carbon Antioxidation Protection, 2000, Journal of the European Ceramic Society, vol. 21, pp. 325-329.*
(Continued)

*Primary Examiner* — Carlos A Rivera
*Assistant Examiner* — Danielle M. Christensen
(74) *Attorney, Agent, or Firm* — David D. Brush; Westman, Champlin & Koehler, P.A.

(57) ABSTRACT

Disclosed is a turbine rotor device for a gas turbine, the turbine rotor device comprising a turbine rotor body, and a pre-stressed fiber-wound layer, wherein the pre-stressed fiber-wound layer is wound on the periphery of the turbine rotor body to exert a predetermined pre-loading force on the turbine rotor body. Additionally, a rotor, and a gas turbine and a turbine engine having the turbine rotor device are also provided.

12 Claims, 4 Drawing Sheets

(51) Int. Cl.
*F01D 5/03* (2006.01)
*F01D 5/34* (2006.01)

(52) U.S. Cl.
CPC .......... *F01D 5/34* (2013.01); *F05D 2300/603* (2013.01); *Y02T 50/672* (2013.01); *Y02T 50/673* (2013.01)

(56) References Cited

U.S. PATENT DOCUMENTS

| | | | | |
|---|---|---|---|---|
| 4,017,209 A * | 4/1977 | Bodman | ................ | F01D 5/187 416/190 |
| 5,429,877 A | 7/1995 | Eylon | | |
| 5,829,955 A | 11/1998 | Saito et al. | | |
| 7,497,661 B2 * | 3/2009 | Boury | ................ | F01D 5/081 416/193 A |
| 2012/0197597 A1 * | 8/2012 | Mitchell | ................ | F01D 17/02 702/188 |

FOREIGN PATENT DOCUMENTS

| | | |
|---|---|---|
| CN | 102491128 A | 6/2012 |
| DE | 4411679 C1 | 12/1994 |
| EP | 1627726 A1 | 2/2006 |
| EP | 1859897 A1 | 11/2007 |
| GB | 938123 A | 10/1963 |
| GB | 2065237 A | 6/1981 |

OTHER PUBLICATIONS

Accuratus, Aluminum Oxide, Al2O3 Ceramic Properties, Feb. 9, 2009 courtesy of waybackmachine.org, http://accuratus.com/alumox.html.*
International Search Report for Application No. PCT/CN2012/078518 dated Sep. 27, 2012.
Chinese Office Action for Application No. 201110233574.X dated Jan. 16, 2013.
Extended European Search Report for Application No. EP12823737 dated Jun. 5, 2015.

* cited by examiner

ROTOR DEVICE, TURBINE ROTOR DEVICE, AND GAS TURBINE AND TURBINE ENGINE HAVING SAME

CROSS REFERENCE TO RELATED APPLICATIONS

The present application is a national phase entry under 35 U.S.C. § 371 of International Application No. PCT/CN2012/078518 filed on Jul. 11, 2012, which claims priority from Chinese Patent Application No. 201110233574.X filed on Aug. 15, 2011, all of which are incorporated herein by reference.

FIELD

Embodiments of the present invention generally relate to a turbine engine field and a gas turbine field, particularly to a rotor device wound by prestressed fibers, specifically a turbine rotor device, a gas turbine and a turbine engine having the turbine rotor device.

BACKGROUND

The turbine rotor is a key element in the aerospace engine and gas turbine. In a severe operation condition, such as high temperature and high rotating speed, a stable operation of the turbine rotor for a long time is required. Complicate loads, such as a centrifugal force generated by high rotating speed, a thermal stress, an aerodynamic force of the gas or vapor and vibration load, are exerted on the rotor disc and blades of the turbine rotor, which forms a stress state mainly composed of the tensile stress. Therefore, turbine materials must have a high strength and an excellent fatigue resistance at a high temperature.

However, if the blade or the rotor disc of the turbine rotor was broken into fragments, the fragments would be splashed with a high speed due to the large centrifugal force, and damage the engine and the other components seriously.

In order to improve the safety, the reliability and the working performance of the turbine rotor, variant superalloys having an excellent high-temperature performance, such as the nickel-based alloy, the cobalt-based alloy, the iron-based alloy or the titanium-aluminum alloy, have been developed. In addition, many materials and manufacturing technologies of the directional crystallization blade and the single crystal blade also have been developed. The technologies improve the operating performance of the turbine rotor by means of enhancing the high-temperature performance of the materials of the turbine rotor or reducing the operating temperature of the turbine rotor. However, the force and the stress state applied on the turbine rotor are not changed much, such that the working loading of the turbine rotor is not optimized at all.

SUMMARY

Embodiments of the present invention seek to solve at least one of the problems existing in the prior art to at least some extent.

Accordingly, a turbine rotor device with enhanced fatigue life and working temperature is provided, thus improving the safety of the turbine rotor device.

Moreover, a rotor device with enhanced fatigue life and working temperature is provided, thus improving the safety of the turbine rotor.

In addition, a gas turbine and a turbine engine having the turbine rotor device are provided.

According to a first aspect of the present invention, a turbine rotor device is provided, including a turbine rotor body; and a prestressed fiber-winding layer disposed on a periphery of the turbine rotor body for exerting a predetermined pre-loading force on the turbine rotor body.

Thus, the working stress of the turbine rotor may be reduced by means of the predetermined preloading force provided by the prestressed fiber-winding layer, so as to improve the service life and the working temperature of the turbine rotor. In addition, with the multilayer structure of the prestressed fiber-winding layer, the extension of cracks generated within the turbine rotor body at a high temperature can be prevented, thus providing the turbine rotor device with a cracking prevention performance and further improving the safety of the gas turbine having the turbine rotor device.

In some embodiments, a coefficient of thermal expansion of the prestressed fiber-winding layer is less than or equal to that of the turbine rotor body.

Thus, the predetermined pre-loading force provided by the prestressed fiber-winding layer and an extra pre-loading force generated by different coefficients of thermal expansion of the prestressed fiber-winding layer and the turbine rotor body at a high temperature can be combined to further reduce the working stress of the turbine rotor device, thus improving the service life and the working temperature of the turbine rotor device.

According to a second aspect of the present invention, a gas turbine is provided, including the turbine rotor device.

According to a third aspect of the present invention, a turbine engine is provided, including the turbine rotor device.

According to a fourth aspect of the present invention, a rotor device is provided, including a rotor body; and a prestressed fiber-winding layer disposed on a periphery of the rotor body for exerting a predetermined pre-loading force on the rotor body.

Thus, the working stress of the turbine rotor may be reduced by means of the predetermined pre-loading force provided by the prestressed fiber-winding layer, so as to improve the service life and the working temperature of the turbine rotor. In addition, with the multilayer structure of the prestressed fiber-winding layer, the extension of cracks generated within the turbine rotor body at a high temperature can be prevented, thus providing the turbine rotor device with a cracking prevention performance and further improving the safety of the gas turbine having the turbine rotor device.

In some embodiments, a coefficient of thermal expansion of the prestressed fiber-winding layer is less than or equal to that of the rotor body.

Thus, the predetermined pre-loading force provided by the prestressed fiber-winding layer and an extra pre-loading force generated by different coefficients of thermal expansion of the prestressed fiber-winding layer and the turbine rotor body at a high temperature can be combined to further reduce the working stress of the turbine rotor device, thus improving the service life and the working temperature of the turbine rotor device.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

REFERENCE NUMERALS 1 turbine rotor body (rotor body)
2 prestressed fiber-winding layer
11 rotor disc
112 mortise
12 tenon
122 rib
13 blade
14 shroud
21 receiving trough
22 prestressed fibers
23 sealing cover plate

DETAILED DESCRIPTION

Reference will be made in detail to embodiments of the present invention. The same or similar elements and the elements having same or similar functions are denoted by like reference numerals throughout the descriptions. The embodiments described herein with reference to drawings are explanatory, illustrative, and used to generally understand the present invention. The embodiments shall not be construed to limit the present invention.

In the specification, unless specified or limited otherwise, relative terms such as "central", "longitudinal", "lateral", "front", "rear", "right", "left", "inner", "encasing", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of the technical features. Thus, the technical feature limited by "first" and "second" may indicate or imply to include one or more technical features. In the description of the present invention, "plurality" means two or more than two, unless otherwise specified.

The present invention is based on the following conceptions of the inventors, i.e., fibers having a low mass density, a high strength and an excellent high-temperature performance are wound on a periphery of the turbine rotor under a predetermined tensile stress, and the fibers exert a predetermined pre-loading force on a rotor, such as the turbine rotor, to reduce the working stress of the rotor, so as to improve a service life and a working temperature of the rotor.

An extra pre-loading force generated by different coefficients of thermal expansion of the prestressed fiber-winding layer and the rotor body at a high temperature can dramatically improve the service life and the working temperature of the gas turbine.

Moreover, with a protection of the prestressed fiber-winding layer, the turbine rotor can have a good cracking prevention performance, thus improving the safety of the turbine rotor.

The pre-stressing technology is a structure design technology aiming at improving a fatigue resistance and a bearing capacity of the structure via changing working stress states of the structure and the material. Thus, either the main working stress state of the whole structure changes into a compressive stress state from a tensile stress state, or the tensile stress is decreased greatly so as to improve the fatigue resistance of the whole structure.

In order to overcome the defect that the working temperature of the prestressed steel wire winding in the related art is not more than 80° C., otherwise, the creep and the relaxation of the steel wire may happen at a high temperature, in some embodiments of the present invention, the wire or fiber with a low mass density, a high strength and a high temperature resistance is adopted as a prestressed winding element.

In some embodiments of the present invention, in order to improve the high temperature performance of the fiber, one or more of the carbon fiber, silicon carbide fiber, alumina fiber and boron fiber may be adopted as the fiber. For example, the fiber may be a general purpose polyacrylonitrile (PAN) based carbon fiber T700 produced by Toray Industries, in which a density of the PAN based carbon fiber is 1.80 g/cm3, a tensile strength of the PAN based carbon fiber may reach 4.9 GPa, and a working temperature of the PAN based carbon fiber may be retained at over 2000° C. under anaerobic conditions without the high temperature creep.

The rotor device, the gas turbine and the turbine engine having the rotor device according to embodiments of the present invention will be described in the following with reference to the drawings.

It would be appreciated by those skilled in the art that the turbine rotor device used for the gas turbine is taken as an example to describe the present invention, however, the turbine rotor device is only for illustration purpose and cannot be construed to limit the present disclosure. After reading some embodiments of the present invention, those skilled in the art will easily apply the turbine rotor device to other assemblies such as a compressor rotor and a fan propeller of the turbine engine and to other turbine engines, thus improving the performance of the rotor at a high temperature.

FIGS. 1 to 8 are schematic perspective views of the turbine rotor device used for the gas turbine according to some embodiments of the present invention.

As shown in FIGS. 1 to 8, the turbine rotor device for the gas turbine according to some embodiments of the present invention includes a turbine rotor body 1 and a prestressed fiber-winding layer 2, in which the prestressed fiber-winding layer 2 is disposed on a periphery of the turbine rotor body 1 so as to exert a predetermined pre-loading force on the turbine rotor body 1. Thus, the working stress within the turbine rotor may be reduced by means of the predetermined pre-loading force exerted by the prestressed fiber-winding layer 2, thus improving the service life and the working temperature of the turbine rotor.

In one embodiment of the present invention, a coefficient of thermal expansion of the prestressed fiber-winding layer 2 is less than or equal to that of the turbine rotor body 1.

The predetermined pre-loading force provided by the prestressed fiber-winding layer 2 and an extra pre-loading force generated by different coefficients of thermal expansion of the prestressed fiber-winding layer 2 and the turbine rotor body 1 can be combined to further reduce the working stress of the turbine rotor, thus improving the service life and the working temperature of the turbine rotor.

In addition, the prestressed fiber-winding layer 2 wound by prestressed fibers layer by layer may prevent the extension of cracks generated within the turbine rotor body 1 at a high temperature, thus providing the turbine rotor device with a cracking prevention performance and further improving the safety of the gas turbine.

The turbine rotor device for the gas turbine according to embodiments of the present invention will be described in detail with reference to FIGS. 1-8.

First Embodiment

Figure 1:
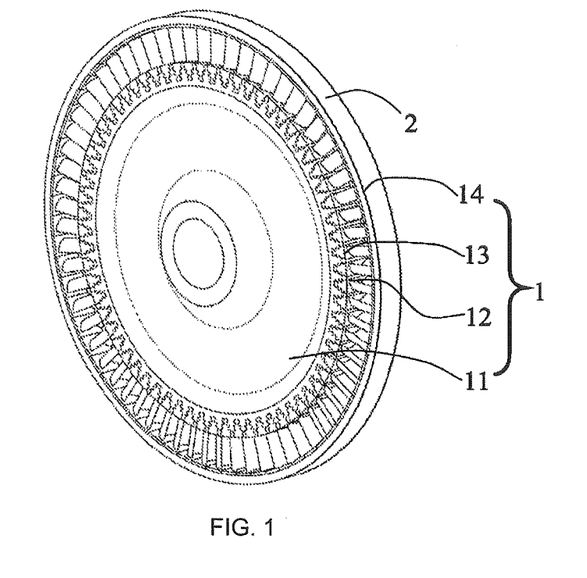
FIG. 1 is a schematic perspective view of a turbine rotor device according to a first embodiment of the present invention.
Figure 2:
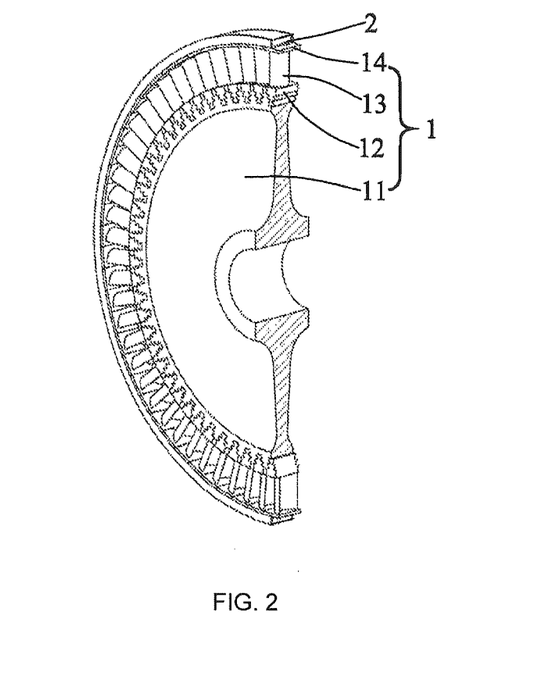
FIG. 2 is a partial perspective view of the turbine rotor device in FIG. 1.
Figure 3:
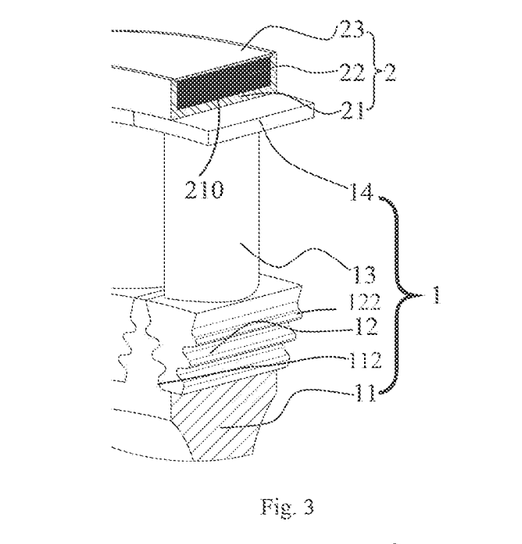
FIG. 3 is a partial enlarged view of the turbine rotor device in FIG. 2.

As shown in FIGS. 1 to 3, a turbine rotor device according to a first embodiment of the present invention includes a turbine rotor body 1 and a prestressed fiber-winding layer 2 wound on a periphery of the turbine rotor body 1.

As shown in FIG. 3, the turbine rotor body 1 includes a rotor disc 11, a tenon 12, blades 13 and a shroud 14. The blade 13 is fixed on a periphery of the rotor disc 11 via the tenon 12, and the shroud 14 is disposed on a periphery of the blade 13.

The prestressed fiber-winding layer 2 includes a receiving trough 21 and prestressed fibers 22. The receiving trough 21 is disposed on the periphery of the turbine rotor body 1 and defines a receiving groove 210 extended in a circumferential direction of the receiving trough 21. The prestressed fibers 22 are wound within the receiving groove 210 under a predetermined tensile stress.

In one embodiment, a coefficient of thermal expansion of the prestressed fiber-winding layer 2 is less than or equal to that of the turbine rotor body 1. Thus, the predetermined pre-loading force provided by the prestressed fiber-winding layer 2 and an extra pre-loading force generated by different coefficients of thermal expansion of the prestressed fiber-winding layer 2 and the turbine rotor body 1 can be combined to further reduce the working stress of the turbine rotor device, thus improving the service life and the working temperature of the turbine rotor device.

In one embodiment, the prestressed fiber-winding layer 2 further includes: a sealing cover plate 23 for sealing the receiving groove 210 of the receiving trough 21 to form a sealing structure, thus isolating the prestressed fiber-winding layer 2 from the ambient air.

Moreover, the receiving trough 21 may be manufactured from high-temperature-resisting materials with a low mass density, such as a titanium alloy, a TiAl based alloy, a carbon/carbon composite and an alumina ceramic. The receiving trough 21 is substantially manufactured of an annular shape adapted to fit the periphery of turbine motor body 1, and the receiving groove 210 extended in the circumferential direction of the receiving trough 21 is formed on a periphery of the receiving trough 21, as shown in FIG. 3.

The prestressed fibers 22 are at least one of carbon fiber, silicon carbide fiber, alumina fiber, boron fiber and other materials having a low mass density, a high strength and an excellent high-temperature performance.

Preferably, the prestressed fibers are wound within the receiving trough 21 layer by layer under a tensile stress ranging from 0 to 10.0 GPa, so as to form the prestressed fiber-winding layer 2 having a thickness ranging from 0.5 mm to 100 mm in a radial direction of the turbine rotor body 1. Thus, the prestressed fiber-winding layer 2 exerts a predetermined pre-loading force on the turbine rotor body 1 in the radial direction.

Therefore, the creation and extension of the cracks within the turbine rotor body 1 at a high temperature can be prevented efficiently, and the fatigue resisting performance of the turbine rotor body 1 and the safety of the gas turbine also are further improved. When the damage to the turbine rotor body 1 occurs, the prestressed fiber-winding layer 2 wound on the periphery of the turbine rotor body 1 can reduce the developing speed of the cracks within itself, thus preventing broken fragments from splashing, and avoiding a secondary damage.

In this embodiment, the coefficient of thermal expansion of the prestressed fibers 22 is less than or equal to that of the turbine rotor body 1 (namely, the rotor disc 11, tenon 12, blade 13 and shroud 14). For example, the coefficient of thermal expansion of the prestressed carbon fibers 22 is about $0.93 \times 10-6/° C.$ and the coefficient of thermal expansion of the turbine rotor body 1 ranges from about $11 \times 10-6/° C.$ to about $16 \times 10-6/° C.$ When the turbine rotor device is operated, the actual pre-loading force on the turbine rotor body 1 is greater than the initial pre-loading force due to the thermally induced pre-loading force generated by the different coefficients of thermal expansion of the prestressed fibers 22 and the turbine rotor body 1 and the uneven distribution of the working temperature of the turbine rotor body 1. Thus, the working tensile stress of the turbine rotor body 1 is further reduced and the load condition of the gas turbine is improved.

Moreover, the actual pre-loading force of the prestressed fibers 22 will be increased with the rise of the working temperature of the turbine rotor body 1, thus effectively compensating for the decreasing strength performance of the turbine rotor body 1 at a high temperature.

Similar to the receiving trough 21, the sealing cover plate 23 may also be manufactured from high-temperature-resisting materials with a low mass density, such as the titanium alloy, the TiAl based alloy, the carbon/carbon composite and the alumina ceramic. The sealing cover plate 23 is disposed on an outer side of the prestressed fibers 22 wound within the receiving trough 21 to isolate the prestressed fibers 22 from the ambient air, thus preventing the prestressed fibers 22 from being oxidized and ablation at a high temperature.

The assembling processes and the beneficial effects of the turbine rotor device according to the first embodiment of the present invention will be described briefly in the following.

During the assembling process, as shown in FIGS. 1 to 3, firstly, the turbine rotor body 1 is formed by assembling the rotor disc 11, the tenon 12, the blade 13 and the shroud 14 together. After the receiving trough 21 is fitted over the shrouds 14 of the blades 13 with a gap ranging from 0.001 mm to 0.01 mm, the prestressed fibers 22 are wound within the receiving groove 210 of the receiving trough 21 layer by layer with the tensile stress ranging from 0 to 10.0 GPa, so as to form the prestressed fiber-winding layer 2 with the thickness ranging from 0.5 mm to 100 mm in the radial direction of the turbine rotor body 1. Then, the sealing cover plate 23 is disposed in the receiving groove 210 of the receiving trough 21 to cover the prestressed fibers 22. Finally, the sealing cover plate 23 and the receiving trough 21 are hermetically connected by connecting joints between the sealing cover plate 23 and the receiving groove 210 via electron beam welding, laser welding or sintering.

With the turbine rotor device according to the first embodiment of the present invention, it is possible to accurately exert an initial pre-stressing force (a pressure) ranging from 300 MPa to 600 MPa on the rotor disc 11 and the blade 13 via effectively setting the tensile stress of the prestressed fibers 22.

Furthermore, the pre-loading force provided by the prestressed fiber-winding layer 2 and the extra pre-loading force generated by the different coefficients of thermal expansion of the prestressed fiber-winding layer 2 and the turbine rotor body 1 at a high temperature can be combined to further reduce the working stress of the turbine rotor device, thus improving the service life and the working temperature of the turbine rotor device.

Finally, with the multilayer structure of the prestressed fiber-winding layer 2, the extension of cracks within fiber-winding layer 2 itself can be slowed down, thus providing the turbine rotor device an exploding resisting ring and further improving the safety of the gas turbine.

Second Embodiment

Figure 4:
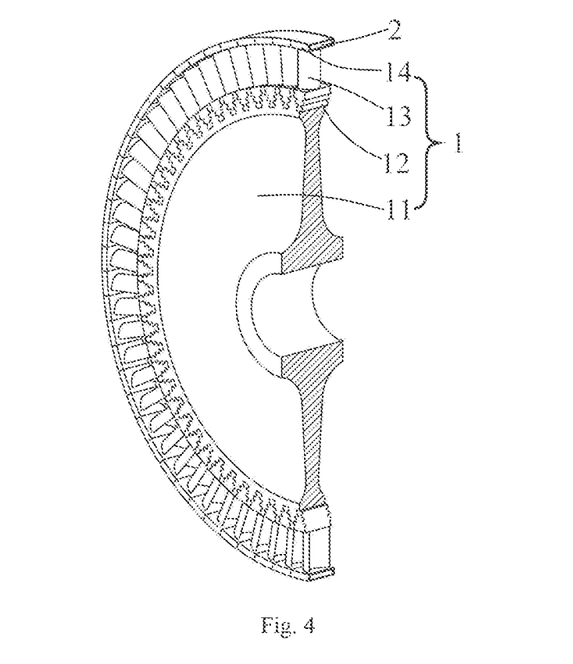
FIG. 4 is a partial perspective view of a turbine rotor device according to a second embodiment of the present invention.
Figure 5:
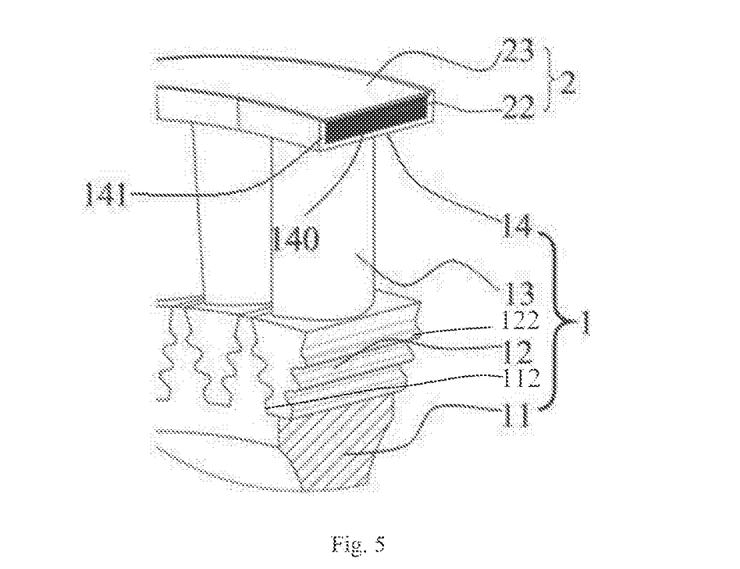
FIG. 5 is a partial enlarged view of the turbine rotor device in FIG. 4.

As shown in FIGS. 4 and 5, the turbine rotor device according to a second embodiment of the present invention includes a turbine rotor body 1 and a prestressed fiber-winding layer 2 wound on a periphery of the turbine rotor body 1.

As shown in FIG. 5, the turbine rotor body 1 includes a rotor disc 11, a tenon 12, a blade 13 and a shroud 14. The blade 13 is fixed on a periphery of the rotor disc 11 via the tenon 12, and the shroud 14 is disposed on a periphery of the blade 13, in which two circumferential edges of the shroud 14 are extended outwards in a radial direction to form a receiving groove 140 (equivalent to forming the receiving trough 21 and the shroud 14 in the first embodiment of the present invention integrally).

The prestressed fibers 22 are at least one of carbon fiber, silicon carbide fiber, alumina fiber, boron fiber and other materials having a low mass density, a high strength and an excellent high-temperature performance.

Preferably, the prestressed fibers 22 are wound within the receiving groove 140 layer by layer under a tensile stress ranging from 0 to 10.0 GPa, so as to form the prestressed fiber-winding layer 2 having a thickness ranging from 0.5 mm to 100 mm in a radial direction of the turbine rotor body 1. Thus, the prestresed fiber-winding layer 2 exerts a predetermined pre-loading force on the turbine rotor body 1 in the radial direction.

Therefore, the creation and extension of the cracks generated within the turbine rotor body 1 at a high temperature can be prevented efficiently, and the fatigue resisting performance of the turbine rotor body 1 and the safety of the gas turbine also are further improved. When the damage to the turbine rotor body 1 occurs, the prestressed fiber-winding layer 2 wound on the periphery of the turbine rotor body 1 can reduce the developing speed of the cracks within itself, thus preventing the broken fragments from splashing, and avoiding a secondary damage.

In this embodiment, the coefficient of thermal expansion of the prestressed fibers 22 is less than or equal to that of the turbine rotor body 1 (namely, the rotor disc 11, tenon 12, blade 13 and shroud 14). For example, the coefficient of thermal expansion of the prestressed carbon fibers 22 is about $0.93 \times 10-6/^\circ$ C. and the coefficient of thermal expansion of the turbine rotor body 1 ranges from about $11 \times 10-6/^\circ$ C. to about $16 \times 10-6/^\circ$ C.

When the turbine rotor device is operated, the actual pre-loading force on the turbine rotor body 1 is greater than the initial pre-loading force due to the thermally induced pre-loading force generated by the different coefficients of thermal expansion of the prestressed fibers 22 and the turbine rotor body 1 and the uneven distribution of the working temperature of the turbine rotor body 1. Thus, the tensile working stress of the turbine rotor body 1 is further reduced and the load condition of the gas turbine is improved.

Moreover, the actual pre-loading force of the prestressed fibers 22 can be increased with the rise of the working temperature of the turbine rotor body 1, thus effectively compensating for the decreasing strength performance of the turbine rotor body 1 at a high temperature.

The sealing cover plate 23 may be manufactured from high-temperature-resisting materials with a low mass density, such as the titanium alloy, the TiAl based alloy, the carbon/carbon composite and the alumina ceramic. The sealing cover plate 23 is disposed on an outer side of the prestressed fibers 22 wound within the receiving groove 140 to isolate the prestressed fibers 22 from the ambient air, thus preventing the prestressed fibers 22 from being oxidized and ablation at a high temperature.

The assembling processes and the beneficial effects of the turbine rotor device according to the second embodiment of the present invention will be described simply in the following.

During the assembling process, as shown in FIGS. 4 and 5, firstly, the turbine rotor body 1 is formed by assembling the rotor disc 11, the tenon 12, the blade 13 and the shroud 14 together. The prestressed fibers 22 are wound within the receiving groove 140 of the shroud 14 layer by layer under the tensile stress ranging from 0 to 10.0 GPa, so as to form the prestressed fiber-winding layer 2 with the thickness ranging from 0.5 mm to 100 mm in the radial direction of the turbine rotor body 1. Then, the sealing cover plate 23 is disposed in the receiving groove 140 of the shroud 14 to cover the prestressed fibers 22. Finally, the sealing cover plate 23 and the shroud 14 are hermetically connected by connecting joints between the sealing cover plate 23 and the receiving groove 140 via electron beam welding, laser welding or sintering.

With the turbine rotor device according to the second embodiment of the present invention, it is possible to accurately exert an initial pre-stressing force (a pressure) ranging from 300 MPa to 600 MPa on the rotor disc 11 and the blade 13 via effectively setting the tensile stress of the prestressed fibers 22.

Furthermore, the pre-loading force provided by the prestressed fiber-winding layer 2 and the extra pre-loading force generated by the different coefficients of thermal expansion of the prestressed fiber-winding layer 2 and the turbine rotor body 1 at a high temperature can be combined to further reduce the working stress of the turbine rotor device, thus improving the service life and the working temperature of the turbine rotor device.

Finally, with the multilayer structure of the prestressed fiber-winding layer 2, the extension of cracks within fiber-winding layer s itself can be slowed down, thus providing the turbine rotor device with an exploding resisting ring and further improving the safety of the gas turbine.

Third Embodiment

Figure 6:
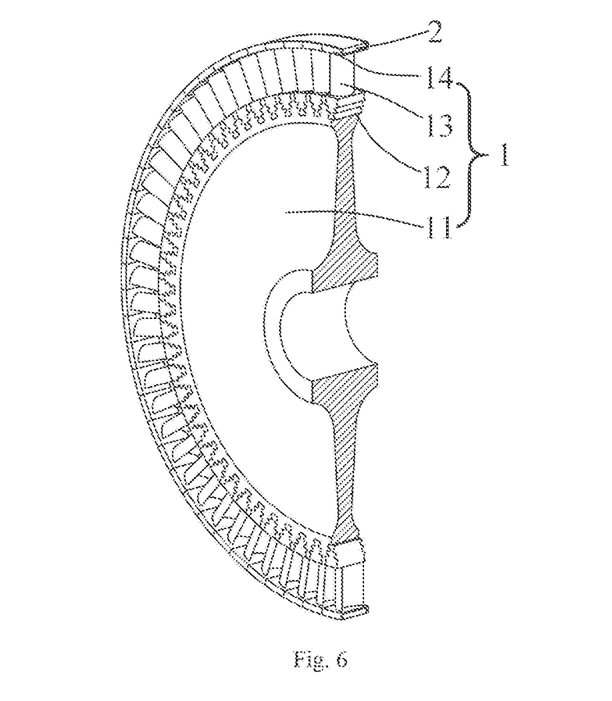
FIG. 6 is a partial perspective view of a turbine rotor device according to a third embodiment of the present invention.
Figure 7:
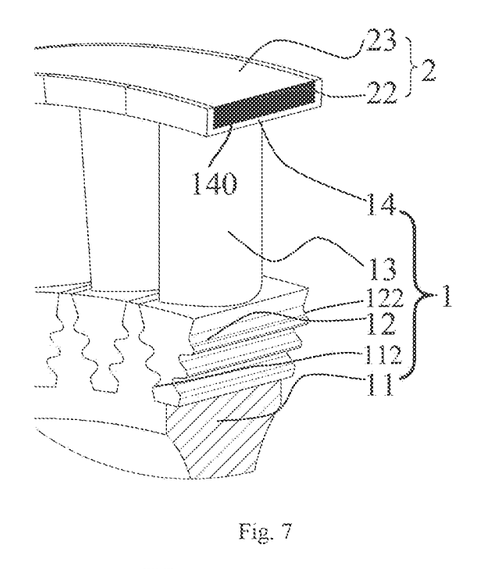
FIG. 7 is a partial enlarged view of the turbine rotor device in FIG. 6.

FIGS. 6 and 7 illustrate a structure of a turbine rotor device according to a third embodiment of the present invention. As shown in FIGS. 6 and 7, a difference between the turbine rotor device in the third embodiment of the present invention and that in the second embodiment of the present invention only is the structure of the prestressed fiber-winding layer 2. Thus, the following description is focused on the prestressed fiber-winding layer 2, and other structures identical to those in the second embodiment of the present invention are omitted.

The prestressed fibers 22 are at least one of carbon fiber, silicon carbide fiber, alumina fiber, boron fiber and other materials having a low mass density, a high strength and an excellent high-temperature performance.

Preferably, the prestressed fibers 22 are wound within the receiving groove 140 layer by layer under a tensile stress ranging from 0 to 10.0 GPa, so as to form the prestressed fiber-winding layer 2 having a thickness ranging from 0.5 mm to 100 mm in a radial direction of the turbine rotor body 1. Thus, the prestressed fiber-winding layer 2 exerts a predetermined pre-loading force on the turbine rotor body 1 in the radial direction.

Therefore, the creation and extension of the cracks generated within the turbine rotor body 1 at a high temperature can be prevented efficiently, and the fatigue resisting performance of the turbine rotor body 1 and the safety of the gas turbine also are further improved. When the damage to the turbine rotor body 1 occurs, the prestressed fiber-winding layer 2 wound on the periphery of the turbine rotor body 1 can reduce the developing speed of the cracks within itself, thus preventing the broken fragments from splashing, and avoiding a secondary damage.

In this embodiment, the coefficient of thermal expansion of the prestressed fibers 22 is less than or equal to that of the turbine rotor body 1 (namely, the rotor disc 11, tenon 12, blade 13 and shroud 14). For example, the coefficient of thermal expansion of the prestressed fibers 22 is about $0.93 \times 10^{-6}/°C$. and the coefficient of thermal expansion of the turbine rotor body 1 ranges from about $11 \times 10^{-6}/°C$. to about $16 \times 10^{-6}/°C$.

When the turbine rotor device is operated, the actual pre-loading force on the turbine rotor body 1 is greater than the initial pre-loading force due to the thermally induced pre-loading force generated by the different coefficients of thermal expansion of the prestressed fibers 22 and the turbine rotor body 1 and the uneven distribution of the working temperature of the turbine rotor body 1. Thus, the tensile working stress of the turbine rotor body 1 is further reduced and the load condition of the gas turbine is improved.

Moreover, the actual pre-loading force of the prestressed fibers 22 can be increased with the rise of the working temperature of the turbine rotor body 1, thus effectively compensating for the decreasing strength performance of the turbine rotor body 1 at a high temperature.

An anti-oxidation coating such as a silicon carbide coating or an alumina coating is coated on a surface of the prestressed fibers 22, so as to isolate the prestressed fibers from the ambient air, thus preventing the prestressed fibers 22 from being oxidized and ablation at a high temperature.

The assembling processes and the beneficial effects of the turbine rotor device according to the third embodiment of the present invention will be described simply in the following.

During the assembling process, as shown in FIGS. 6 and 7, firstly, the turbine rotor body 1 is formed by assembling the rotor disc 11, the tenon 12, the blade 13 and the shroud 14 together. Then, the prestressed fibers 22 are wound within the receiving groove 140 of the shroud 14 layer by layer under the tensile stress ranging from 0 to 10.0 GPa, so as to form the prestressed fiber-winding layer 2 with the thickness ranging from 0.5 mm to 100 mm in the radial direction of the turbine rotor body 1.

With the turbine rotor device according to the third embodiment of the present invention, it is possible to accurately exert an initial pre-stressing force (a pressure) ranging from 300 MPa to 600 MPa on the rotor disc 11 and the blade 13 via effectively setting the tensile stress of the prestressed fibers 22.

Furthermore, the pre-loading force provided by the prestressed fiber-winding layer 2 and the extra pre-loading force generated by the different coefficients of thermal expansion of the prestressed fiber-winding layer 2 and the turbine rotor body 1 at a high temperature can be combined to further reduce the working stress of the turbine rotor device, thus improving the service life and the working temperature of the turbine rotor device.

Finally, with the multilayer structure of the prestressed fiber-winding layer 2, the extension of cracks within fiber-winding layer 2 itself can be slowed down, thus providing the turbine rotor device with an exploding resisting ring and further improving the safety of the gas turbine.

Fourth Embodiment

Figure 8:
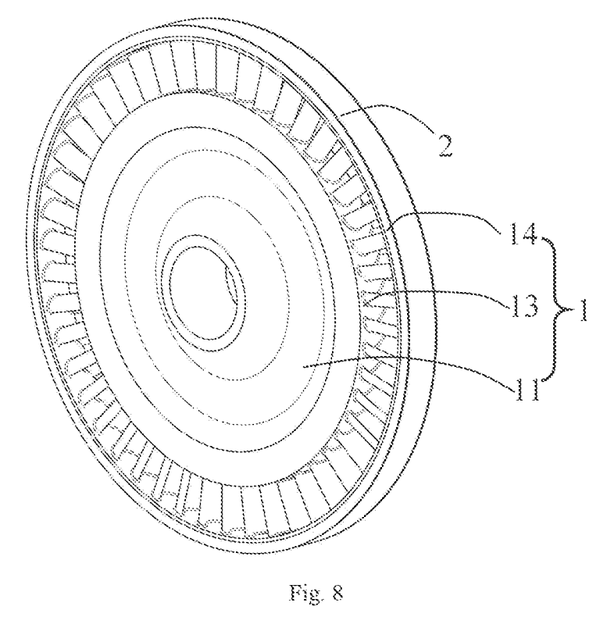
FIG. 8 is a schematic perspective view of the turbine rotor device according to a fourth embodiment of the present invention.

FIG. 8 illustrates a structure of a turbine rotor device according to a fourth embodiment of the present invention. As shown in FIG. 8, a difference between the turbine rotor device in the fourth embodiment and those in the first, second and third embodiments is the structure of the turbine rotor body 1. Thus, the following description is focused on the turbine rotor body 1, and other structures identical to those in the other embodiments of the present invention are omitted.

As shown in FIG. 8, the turbine rotor body 1 includes a rotor disc 11, a blade 13 and a shroud 14. The blade 13 is disposed on a periphery of the rotor disc 11, and the shroud 14 is disposed on a periphery of the blade 13.

With the turbine rotor device according to the fourth embodiment of the present invention, it is possible to accurately exert an initial pre-stressing force (a pressure) ranging from 300 MPa to 600 MPa on the rotor disc 11 and the blade 13 via effectively setting the tensile stress of the prestressed fibers 22.

Furthermore, the pre-loading force provided by the prestressed fiber-winding layer 2 and the extra pre-loading force generated by the different coefficients of thermal expansion of the prestressed fiber-winding layer 2 and the turbine rotor body 1 at a high temperature can be combined to further reduce the working stress of the turbine rotor device, thus improving the service life and the working temperature of the turbine rotor device.

Finally, with the multilayer structure of the prestressed fiber-winding layer 2, the extension of cracks within fiber-winding layer 2 itself can be slowed down, thus providing the turbine rotor device with an exploding resisting ring and further improving the safety of the gas turbine.

In some of embodiments of the present invention, a gas turbine having the turbine rotor device is provided.

With the gas turbine according to embodiments of the preset invention, it is possible to accurately exert an initial pre-stressing force (a pressure) ranging from 300 MPa to 600 MPa on the rotor disc 11 and the blade 13 via effectively setting the tensile stress of the prestressed fibers 22.

Furthermore, the pre-loading force provided by the pre-stressed fiber-winding layer 2 and the extra pre-loading force generated by the different coefficients of thermal expansion of the prestressed fiber-winding layer 2 and the turbine rotor body 1 at a high temperature can be combined to further reduce the working stress of the turbine rotor device, thus improving the service life and the working temperature of the turbine rotor device.

Finally, with the multilayer structure of the prestressed fiber-winding layer 2, the extension of cracks within fiber-winding layer 2 itself can be slowed down, thus providing the turbine rotor device with an exploding resisting ring and further improving the safety of the gas turbine.

In some embodiments of the present invention, a turbine engine having the turbine rotor device is provided.

With the turbine engine according to embodiments of the present invention, it is possible to accurately exert an initial pre-stressing force (a pressure) with a high value on the rotor of the turbine engine via effectively setting the tensile stress of the prestressed fibers 22.

Alternatively, the pre-loading force provided by the pre-stressed fiber-winding layer 2 and the extra pre-loading force generated by the different coefficients of thermal expansion of the prestressed fiber-winding layer 2 and the turbine rotor body 1 at a high temperature can be combined to further reduce the working stress of the rotor, thus improving the service life and the working temperature of the turbine engine.

The turbine rotor device and the gas turbine having the turbine rotor device according to the exemplary embodiments of the present invention are described above. It would be appreciated by those skilled in the art that technical features of the turbine rotor device in the above embodiments of the present invention can be freely combined as long as no conflict occurs. For example, the anti-oxidation coatings may be coated on the surfaces of the prestressed fibers 22 of the turbine rotor devices in the first and second embodiments, or the shroud 14 and the receiving trough 21 in the third embodiment of the present invention may be formed separately, as in the first embodiment. All the above combinations should be within the scope of the present invention.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A turbine rotor device, comprising:
   a turbine rotor body, the turbine rotor body comprising:
      a rotor disc;
      a blade disposed on a periphery of the rotor disc by means of a tenon; and
      a shroud disposed on a periphery of the blade; wherein the tenon, blade, and shroud are integrally formed; and
   a prestressed fiber-winding layer disposed on a periphery of the shroud for exerting a predetermined pre-loading force on the turbine rotor body, the prestressed fiber-winding layer comprising:
      a receiving trough disposed on the periphery of the turbine rotor body and defining an integral receiving groove extended in a circumferential direction of the receiving trough;
      prestressed fibers wound within the receiving groove layer by layer under a tensile stress ranging from 0 to 10.0 GPa and having a thickness in a radial direction of the turbine rotor body ranges from 0.5 mm to 100 mm; and
      a sealing cover plate for sealing the receiving trough,
      wherein the tenon has a wedge shape having two inclined surfaces extending in an axial direction of the rotor disc, each inclined surface forms a plurality of ribs protruding in a circumferential direction of the rotor disc and spaced apart from each other, each rib extends in the axial direction of the rotor disc, the periphery of the rotor disc defines a mortise having a shape matching the shape of the tenon, and the tenon is fitted in the mortise;
      wherein the prestressed fibers are at least one of carbon fiber, silicon carbide fiber, alumina fiber and boron fiber;
      wherein the sealing cover plate and the receiving trough are hermetically connected by connecting joints between the sealing cover plate and the receiving groove via electron beam welding, laser welding or sintering.

2. The turbine rotor device of claim 1, wherein a coefficient of thermal expansion of the prestressed fiber-winding layer is less than or equal to that of the turbine rotor body.

3. The turbine rotor device of claim 1, wherein a coefficient of thermal expansion of the prestressed fibers is less than or equal to that of the turbine rotor body.

4. The turbine rotor device of claim 1, wherein the receiving trough and the shroud are formed separately; or
   the receiving trough and the shroud are formed integrally.

5. The turbine rotor device of claim 1, wherein an anti-oxidation coating is coated on a surface of the prestressed fibers.

6. The turbine rotor device of claim 5, wherein the anti-oxidation coating is a silicon carbide coating or an alumina coating.

7. The turbine rotor device of claim 1, wherein the rotor disc and the blade are formed separately; or
   the rotor disc and the blade are formed integrally.

8. The turbine rotor device of claim 1, wherein the turbine rotor device is applied to a gas turbine or a turbine engine.

9. A rotor device, comprising:
   a rotor body, the turbine rotor body comprising:
      a rotor disc;

a blade disposed on a periphery of the rotor disc by means of a tenon; and a shroud disposed on a periphery of the blade; wherein the tenon, blade, and shroud are integrally formed; and a prestressed fiber-winding layer disposed on a periphery of the shroud for exerting a predetermined pre-loading force on the rotor body, the prestressed fiber-winding layer comprises:

a receiving trough disposed on the periphery of the rotor body and defining an integral receiving groove extended in a circumferential direction of the receiving trough;

prestressed fibers wound within the receiving groove layer by layer under a tensile stress ranging from 0 to 10.0 GPa and having a thickness in a radial direction of the turbine rotor body ranges from 0.5 mm to 100 mm; and a sealing cover plate for sealing the receiving trough, wherein the tenon has a wedge shape having two inclined surfaces extending in an axial direction of the rotor disc, each inclined surface forms a plurality of ribs protruding in a circumferential direction of the rotor disc and spaced apart from each other, each rib extends in the axial direction of the rotor disc, the periphery of the rotor disc defines a mortise having a shape matching the shape of the tenon, and the tenon is fitted in the mortise;

wherein the prestressed fibers are at least one of carbon fiber, silicon carbide fiber, alumina fiber and boron fiber;

wherein the sealing cover plate and the receiving trough are hermetically connected by connecting joints between the sealing cover plate and the receiving groove via electron beam welding, laser welding or sintering.

10. The rotor device of claim 9, wherein a coefficient of thermal expansion of the prestressed fiber-winding layer is less than or equal to that of the rotor body.

11. The rotor device of claim 9, wherein an anti-oxidation coating is coated on a surface of the prestressed fibers.

12. A method for manufacturing a turbine rotor device, comprising:

forming a turbine rotor body by assembling a rotor disc, a tenon, a blade and a shroud together; wherein the tenon has a wedge shape having two inclined surfaces extending in an axial direction of the rotor disc, each inclined surface forms a plurality of ribs protruding in a circumferential direction of the rotor disc, and spaced apart from each, each rib extends in the axial direction of the rotor disc, wherein the blade, tenon, and shroud are integrally formed; fitting a receiving trough over the shroud of the turbine rotor body with a gap ranging from 0.001 mm to 0.01 mm;

winding prestressed fibers within a receiving groove of the receiving trough layer by layer with a tensile stress ranging from 0 to 10.0 GPa, so as to form a prestressed fiber-winding layer with the thickness ranging from 0.5 mm to 100 mm in a radial direction of the turbine rotor body;

disposing a sealing cover plate in the receiving groove of the receiving trough to cover the prestressed fibers; and hermetically connecting the sealing cover plate and the receiving trough by connecting joints between the sealing cover plate and the receiving groove via electron beam welding, laser welding or sintering.

* * * * *